March 14, 1933.   R. B. MUNDAY   1,901,256
NONDECANTING LIQUID MEASURE
Filed July 17, 1929   3 Sheets-Sheet 1

Richard B. Munday
INVENTOR.
Walter A. Knight
BY Bennett R. Knight
ATTORNEYS

March 14, 1933. R. B. MUNDAY 1,901,256
NONDECANTING LIQUID MEASURE
Filed July 17, 1929 3 Sheets-Sheet 3

Patented Mar. 14, 1933

1,901,256

UNITED STATES PATENT OFFICE

RICHARD B. MUNDAY, OF DAYTON, OHIO, ASSIGNOR, BY MESNE ASSIGNMENTS, TO THE CINCINNATI BALL CRANK CO., OF CINCINNATI, OHIO, A CORPORATION OF OHIO

NONDECANTING LIQUID MEASURE

Application filed July 17, 1929. Serial No. 378,899.

My invention relates to non-decanting liquid measures and more particularly to means on such measures for enabling purchasers of the liquid to clearly see the contents therein.

My invention is particularly well adapted for use on the type of measure shown and described in reissue Patent No. 17,202 to Walter R. Brookins, reissued Feb. 5, 1929.

The purchasing public has become accustomed to visible gasoline dispensing apparatus in filling stations and demand service from apparatus in which they are enabled to see both the quantity and quality of the product being bought. Realizing the benefits accruing to them from such gasoline apparatus they also desire and demand oil dispensing measures permitting a similar benefit.

The principal object of my invention is to provide a non-decanting liquid measure so constructed as to permit the purchaser of the liquid to clearly see both the quality of the oil and the accuracy of the amount to be delivered. With such a measure he can also clearly see without looking into the top of the measure whether it has been fully drained.

With the present type of measures, that is, those constructed entirely of metal, it is necessary to provide a separate measure for each standard quantity ordinarily sold. A filling station must equip itself with one, two and four quart measures, as now constructed. The law will not permit measures constructed entirely of opaque material to be graduated, so consequently a great variety of sizes of measures is a necessity.

Another object of my invention is to provide a measure partly constructed of transparent material so that the measure can be graduated, and one measure may take the place of the now customary numerous sizes.

Figure 1:
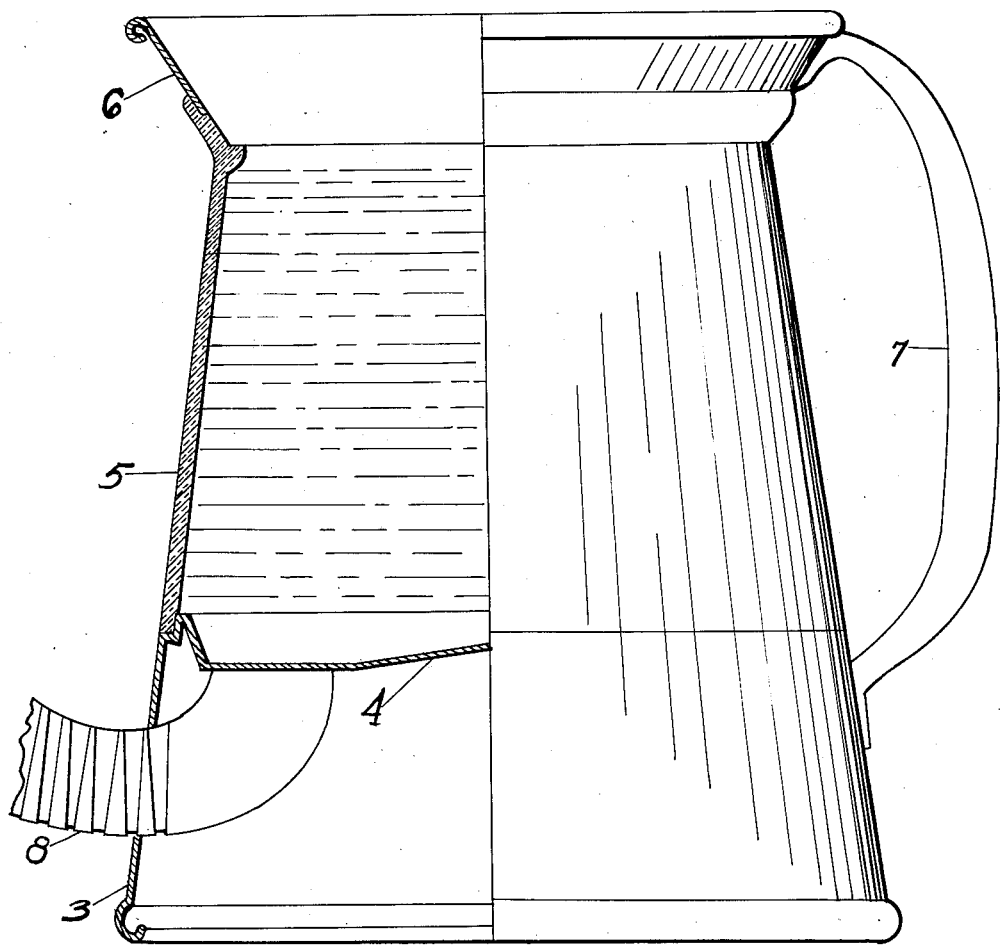
Figure 2:
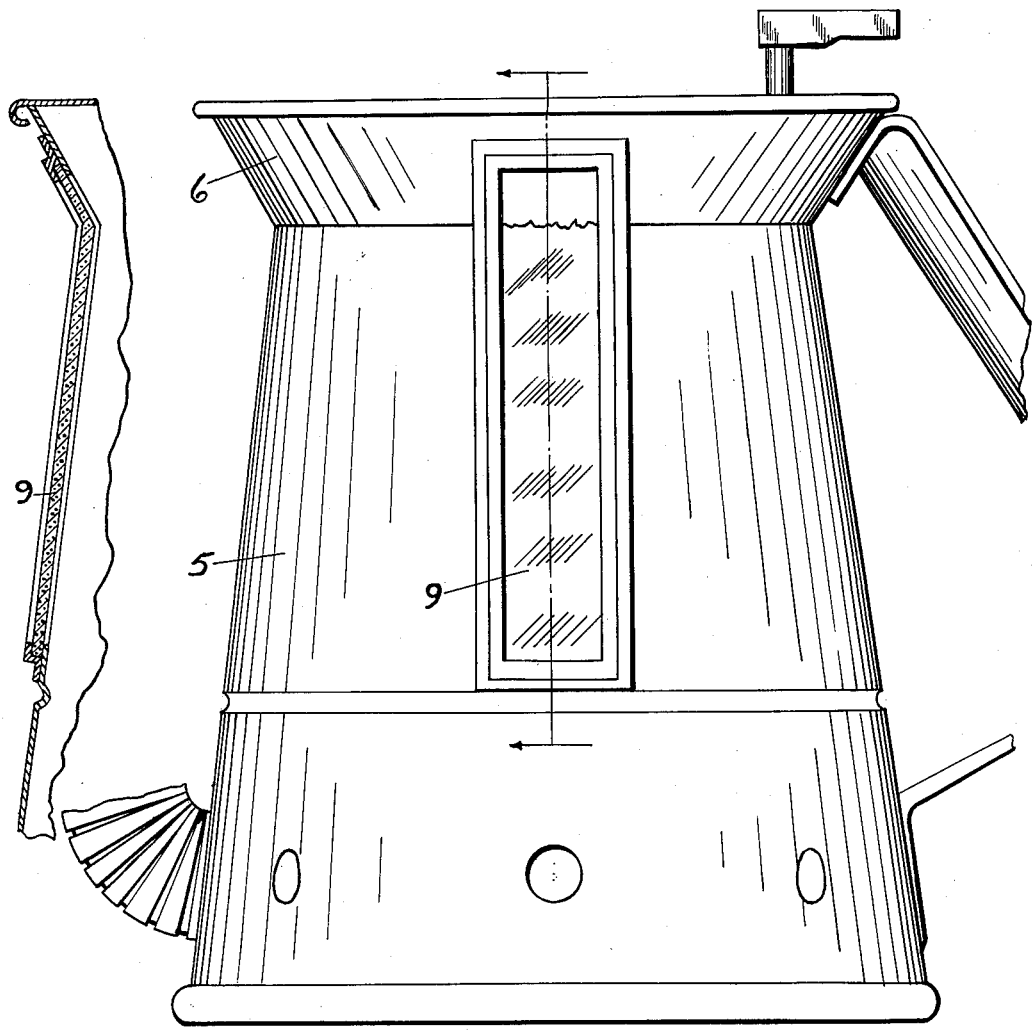
Figure 3:
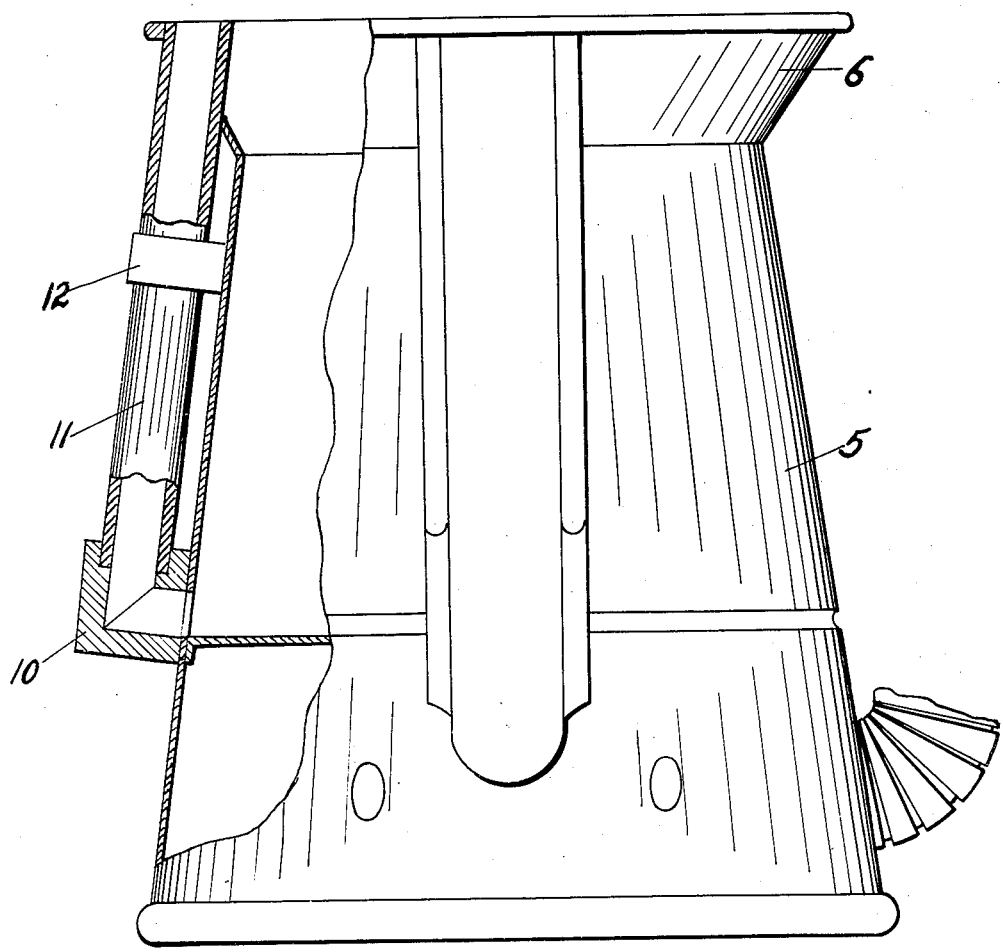

In the particular embodiment of my invention selected for illustration:

Fig. 1 is a side elevation of a measure embodying my improvements and with a part of of the measure shown in vertical section, Fig. 2, another side elevation, shows a modified form of the invention, and Fig. 3, another modification, is a side elevation of a measure.

Referring now to the drawings, and particularly to Fig. 1, the measure is constructed of a bottom skirt or supporting member 3, and a bottom 4, preferably formed integral with the skirt 3. A transparent sidewall 5 is suitably secured between the lip 6 and skirt 3, so that the liquid in the measure may be clearly seen therethrough. The wall 5 may be graduated if desired in any suitable manner. The usual handle 7 is secured at one end to the lip 6, and at its other end to the skirt 3 in any desired manner. A flexible outlet tube 8 secured to the bottom 4 provides means for draining the measure, and a valve (not shown) may be provided to control the flow therethrough from the bottom 4.

Referring now particularly to Fig. 2, the sidewall of the measure is provided with a transparent window 9 which extends from the bottom of the measure up on to the lip 6, being secured to the measure in any approved manner. This window if desired may only extend to the point where the lip and sidewall of the measure are joined.

Referring now particularly to Fig. 3, an oil tight packing joint 10 is secured to the outer wall of the measure and a glass tube 11 is adapted to make fluid communication with the bottom of the measure. A brace or support 12 is secured to the side wall 5 to rigidly support the tube 11. The tube 11 passes through the top or lip 6 and is open ended to permit the level of the liquid in the tube 11 to be identical with that within the measure. This tube 11 may be suitably graduated to properly indicate the amount of liquid within the measure.

I do not wish to be limited to the precise form shown since many changes may be made without departing from the scope of my invention. For instance, the entire measure, including the handle, the bottom, the lip and the skirt may be molded of glass or the sidewall and bottom of the measure may be molded of glass and the skirt may be of metal with a metal top and metal handle, or the sidewall and the lip or top may be molded of glass and the bottom and skirt of metal. My chief endeavor is to provide a measure in which anyone interested can readily see the quantity and quality of the liquid therein, without being compelled to look into the top of the measure.

I claim as my invention and desire to secure by Letters Patent of the United States:

1. A non-decanting open top liquid dispensing measure, comprising, a transparent shell, a metallic outwardly flaring rim socketed within the upper end of the shell, a metallic base for the lower end of the shell providing a bottom for the shell and a supporting skirt, the base formed with an annular recess at the juncture of the bottom and skirt for a socketed connection with the lower end of the shell, and a handle connecting said metallic rim and base.

2. A non-decanting open top liquid measure, comprising, a transparent shell of frusto-conical form for the greater part of its base portion terminating at the top in an outwardly flaring portion to which a metallic rim is attached and forms a continuation of the outwardly flaring rim of the shell, a sheet metal outwardly flaring rim having a socketed connection with the outwardly flaring portion of the shell top, a sheet metal base for the shell integrally providing a bottom closure for the shell and a supporting skirt, the base at the juncture of the bottom and skirt recessed for a socketed connection with the lower end of the shell, the bottom having a discharge outlet and spout, the spout extending through the skirt, and a handle connecting the metallic rim and base.

In testimony whereof I have hereunto set my hand.

RICHARD B. MUNDAY.